(12) United States Patent
Riazi et al.

(10) Patent No.: US 7,639,654 B2
(45) Date of Patent: Dec. 29, 2009

(54) METHOD AND APPARATUS FOR MOBILE BROADBAND WIRELESS COMMUNICATIONS

(75) Inventors: Habib Riazi, Stafford, VA (US); Michael Anthony Zuniga, Fairfax, VA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1504 days.

(21) Appl. No.: 10/231,218

(22) Filed: Aug. 29, 2002

(65) Prior Publication Data

US 2004/0042432 A1 Mar. 4, 2004

(51) Int. Cl.
*H04W 4/00* (2009.01)

(52) U.S. Cl. ............ 370/338; 455/414.3; 709/219

(58) Field of Classification Search ............ None
See application file for complete search history.

(56) References Cited

U.S. PATENT DOCUMENTS

| | | | |
|---|---|---|---|
| 6,400,722 B1 * | 6/2002 | Chuah et al. | 370/401 |
| 6,452,910 B1 * | 9/2002 | Vij et al. | 370/310 |
| 6,542,491 B1 * | 4/2003 | Tari et al. | 370/338 |
| 6,651,105 B1 * | 11/2003 | Bhagwat et al. | 709/239 |
| 6,781,972 B1 * | 8/2004 | Anderlind et al. | 370/329 |
| 6,952,558 B2 * | 10/2005 | Hardacker | 455/3.06 |
| 7,117,266 B2 * | 10/2006 | Fishman et al. | 709/228 |
| 7,203,721 B1 * | 4/2007 | Ben-Efraim et al. | 709/203 |
| 2002/0129088 A1 * | 9/2002 | Zhou et al. | 709/200 |
| 2003/0026231 A1 * | 2/2003 | Lazaridis et al. | 370/338 |
| 2003/0050041 A1 * | 3/2003 | Wu | 455/406 |
| 2003/0157959 A1 * | 8/2003 | Makela et al. | 455/556 |

(Continued)

OTHER PUBLICATIONS

Stephen Berton et al., "CC++: The MIT Media Laboratory's Car Research Group," (Aug. 1999).

(Continued)

*Primary Examiner*—Phirin Sam
(74) *Attorney, Agent, or Firm*—Ryan, Mason & Lewis, LLP

(57) ABSTRACT

Methods and apparatus are disclosed for distributing electronic media to near stationary users, such as in-vehicle users or other mobile users, using short-range high speed wireless access techniques. A content provider stores electronic media at one or more wireless servers positioned at the edge of a network, such as the Internet. The wireless servers transfer the electronic media to one or more subscriber wireless devices using unlicensed frequency bands at relatively short ranges. The wireless servers are generally positioned at convenient locations where users tend to congregate. Media can be cached at desired wireless servers within the distributed mobile broadband network and downloaded to the subscriber wireless devices at the designated locations and subsequently played at the convenience of the user. The caching of content at distributed locations and the use of fast short-range wireless access techniques to near stationary users provide a distributed localized broadband wireless service area that enables the rapid download of large amounts of media content.

29 Claims, 4 Drawing Sheets

U.S. PATENT DOCUMENTS

| | | | |
|---|---|---|---|
| 2004/0077367 A1* | 4/2004 | Sama et al. | 455/518 |
| 2004/0230660 A1* | 11/2004 | Abjanic et al. | 709/207 |
| 2005/0210125 A1* | 9/2005 | Li | 709/219 |
| 2006/0182055 A1* | 8/2006 | Coffee et al. | 370/328 |
| 2007/0005795 A1* | 1/2007 | Gonzalez | 709/232 |
| 2007/0060117 A1* | 3/2007 | Fishman et al. | 455/418 |
| 2007/0277201 A1* | 11/2007 | Wong et al. | 725/40 |

OTHER PUBLICATIONS

Intel Corp., "The Intel® Personal Internet Client Architecture," 1-17, (Sep. 2001).

Mark Long, "Portable Digital Jukebox Stores More than 3,000 Music Tracks," downloaded from www.e-insite.net/index.asp?layout=article&articleid=CA185166 (Dec. 5, 2001).

Mark Long, "Flarion Claims Industry's First Mobile Broadband Data Handoff," downloaded from www.e-insite.net/index.asp?layout=article&articleid+CA187934 (Dec. 21, 2001).

Mark Long, "Stonestreet Demos Bluetooth-Enabled MP3 Player Reference Design," downloaded from www.einsite.net/index.asp?layout=article&articleid=CA237790&title=Article&spacedesc=news&verticalId=163 (Aug. 7, 2002).

* cited by examiner

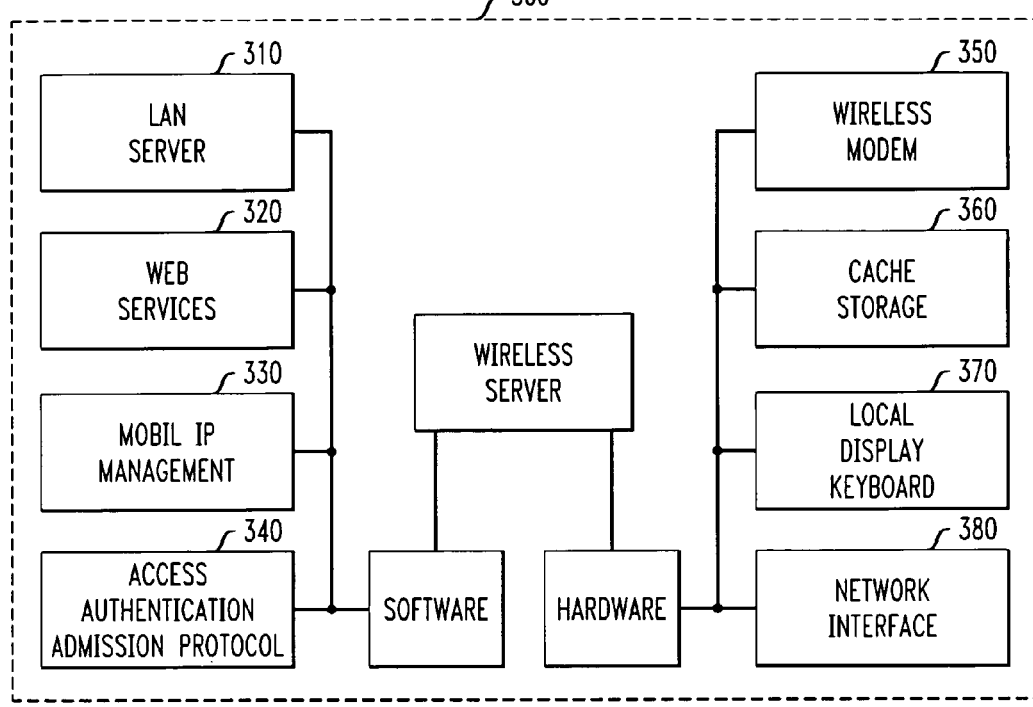
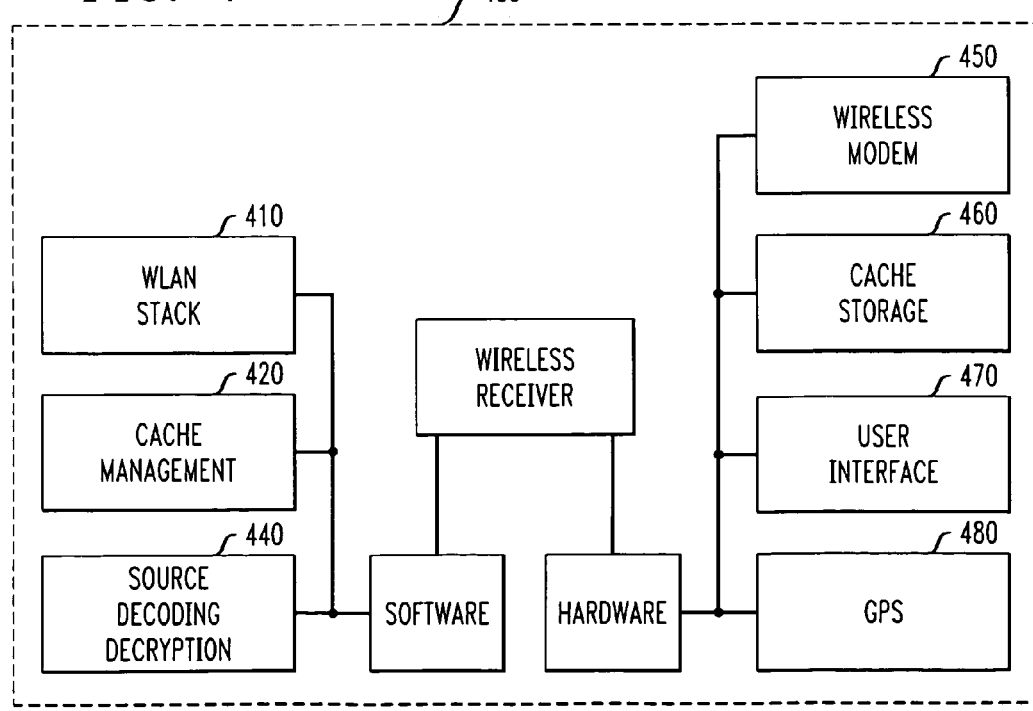

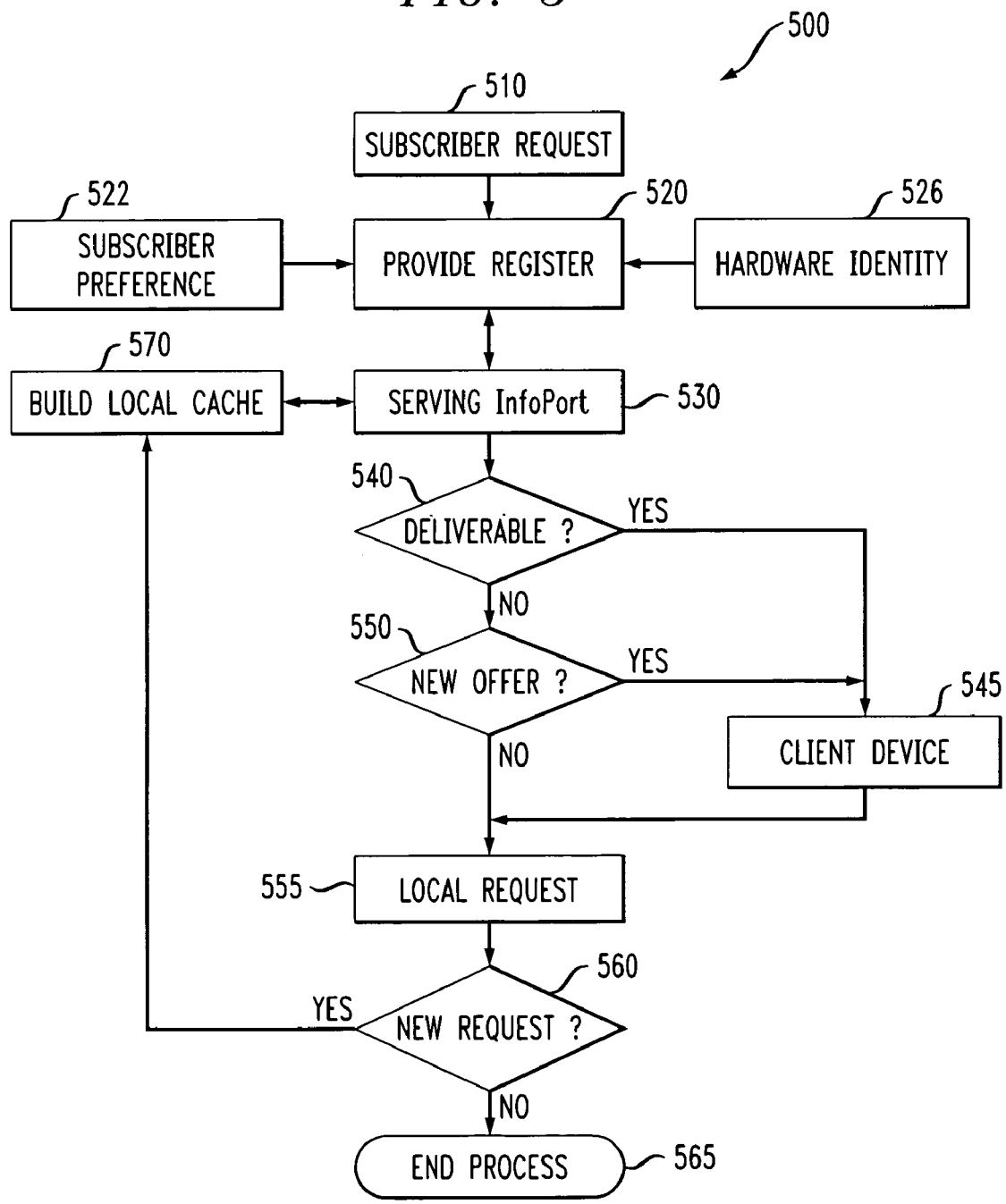

METHOD AND APPARATUS FOR MOBILE BROADBAND WIRELESS COMMUNICATIONS

FIELD OF THE INVENTION

The present invention relates to methods and apparatus for distributing information over a communications network and, more particularly, to a method and apparatus for distributing electronic media to near stationary users, such as in-vehicle users, using short-range wireless access techniques.

BACKGROUND OF THE INVENTION

A number of techniques have been proposed or suggested for improving the access time for Internet resources. Initially, Internet Service Providers (ISPs) responded by offering users Internet access services with ever increasing bandwidth. In the residential marketplace, for example, Digital Subscriber Line (DSL) and cable Internet services have become commonplace. It has been observed, however, that the bandwidth demands of many user applications have increased in proportion to the increased available bandwidth. Thus, there has been little, if any, effective increase in experienced access times.

The inefficient use of bandwidth is particularly problematic in a bandwidth-limited system, such as a wireless network, where the frequency spectrum is typically regulated by government agencies. As users increasingly access the Internet using wireless devices, such as handheld computing devices from Palm, Inc. and Research In Motion Limited (Blackberry), the need for Internet access techniques that make efficient use of the available bandwidth is even more apparent. In addition, to satisfy the bandwidth demands of most users, there is a strong need for wireless Internet access techniques that can deliver a large volume of electronic media with acceptable throughput and quality, notwithstanding the spectrum limitations and the dynamic nature of wireless communication channels.

SUMMARY OF THE INVENTION

Generally, a distributed mobile broadband network is provided that distributes electronic media to near stationary users, such as in-vehicle users or other mobile users, using short-range wireless access techniques. A content provider stores electronic media at one or more wireless servers positioned at the edge of a network, such as the Internet. The wireless servers transfer the electronic media to one or more subscriber wireless devices (SWDs) using unlicensed frequency bands at relatively short ranges. The wireless servers are generally positioned at convenient locations where users tend to congregate.

The present invention recognizes that a significant amount of the multimedia content that is of interest to users does not require real-time updates. Thus, the media can be cached at desired wireless servers within the distributed mobile broadband network and then downloaded to the subscriber wireless devices at the designated locations and subsequently played at the convenience of the user. The caching of content at distributed locations and the use of fast short-range wireless access techniques to near stationary users provide a localized broadband wireless service area that enables the rapid download of large amounts of media content.

A more complete understanding of the present invention, as well as further features and advantages of the present invention, will be obtained by reference to the following detailed description and drawings.

BRIEF DESCRIPTION OF THE DRAWINGS

FIG. 3 is a schematic block diagram of an exemplary wireless server of FIGS. 1 and 2;

FIG. 4 is a schematic block diagram of an exemplary subscriber wireless device of FIGS. 1 and 2; and FIG. 5 is a flow chart describing the operation of an exemplary content caching and delivery process incorporating features of the present invention.

DETAILED DESCRIPTION

Figure 1:
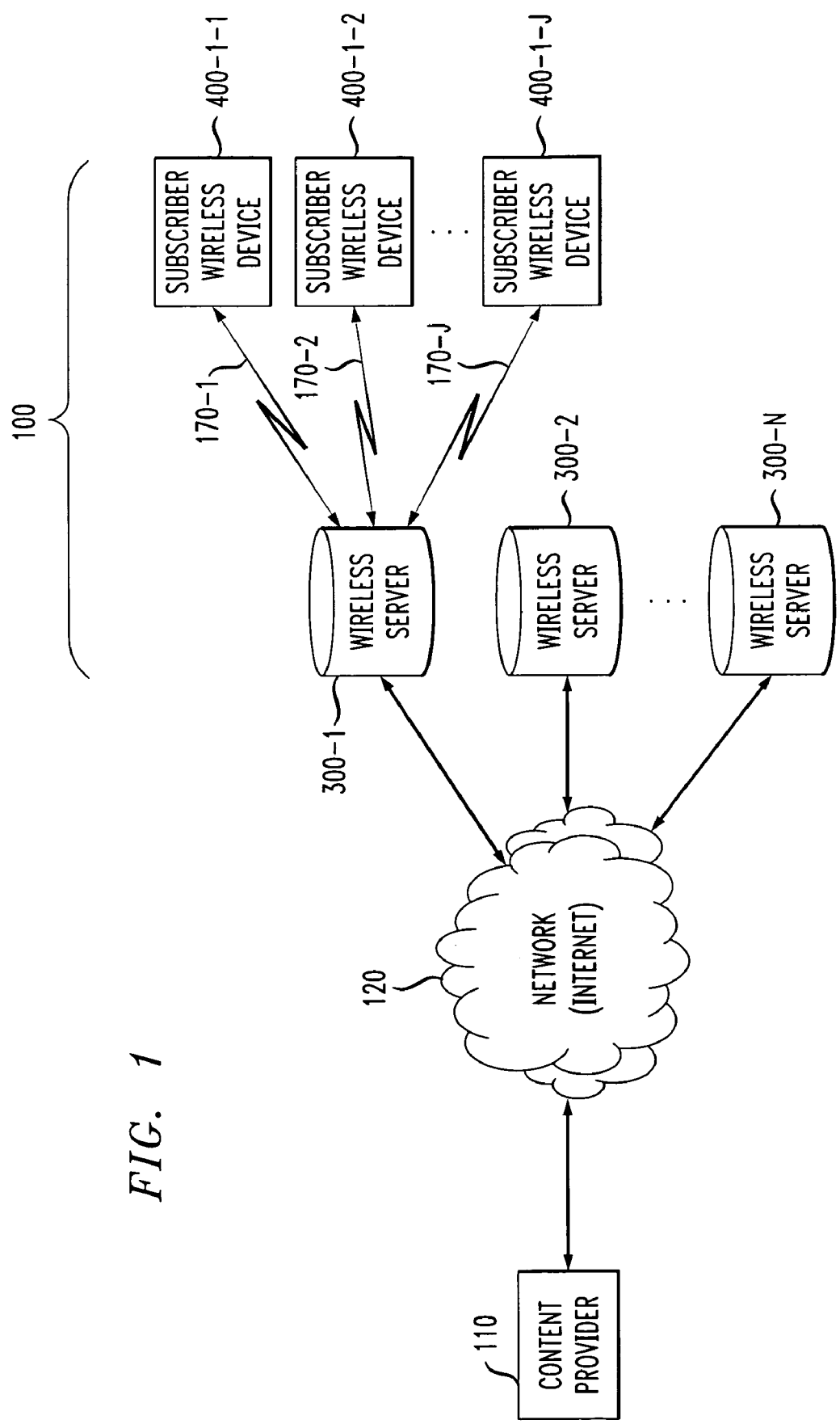
FIG. 1 illustrates a distributed mobile broadband network (DMBN) according to the present invention.

FIG. 1 illustrates a distributed mobile broadband network (DMBN) 100 according to the present invention. According to one aspect of the invention, a content provider 110 pushes electronic media to one or more wireless servers 300-1 through 300-N, hereinafter, collectively referred to as wireless servers 300, discussed below in conjunction with FIG. 3, at the edge of a network 120, such as the Internet. The distributed wireless servers 300 are generally connected through the back haul network 120. Thereafter, each wireless server 300 transfers the electronic media at relatively short range to one or more users in the coverage area of the server 300. The users in a coverage area of a given server 300-$n$ employ a subscriber wireless device 400-$n$-1 through 400-$n$-J (hereinafter, collectively referred to as subscriber wireless devices 400), discussed below in conjunction with FIG. 4, by means of a corresponding wireless connection 170-$j$, for example, using unlicensed frequency bands at short ranges.

The wireless servers 300 are generally positioned at convenient locations where users tend to congregate. The wireless servers 300 distribute media to near stationary subscriber wireless devices 400 using local area, short-range high-speed wireless access techniques. For example, the wireless servers 300 can be positioned at locations with frequent automobile access, such as gas stations, shopping malls or restaurant parking lots, or other convenient places where vehicles or other subscriber wireless devices can easily access. As discussed hereinafter, the wireless servers 300 will be significantly cheaper than existing cellular base stations, due to their size and intended functionality.

The present invention recognizes that a significant amount of the multimedia content that is of interest to users does not require real-time updates. Thus, the media can be cached at desired wireless servers 300 within the distributed mobile broadband network 100 and then downloaded to the subscriber wireless devices 400 at the designated locations and played at the convenience of the user. The caching of content at distributed locations and the use of fast short-range wireless access techniques to near stationary users provide a localized broadband wireless service area and enable the rapid download of large amounts of media content. According to another aspect of the invention, caching is optimized based on the interests and request patterns of the visiting subscribers.

Figure 2:
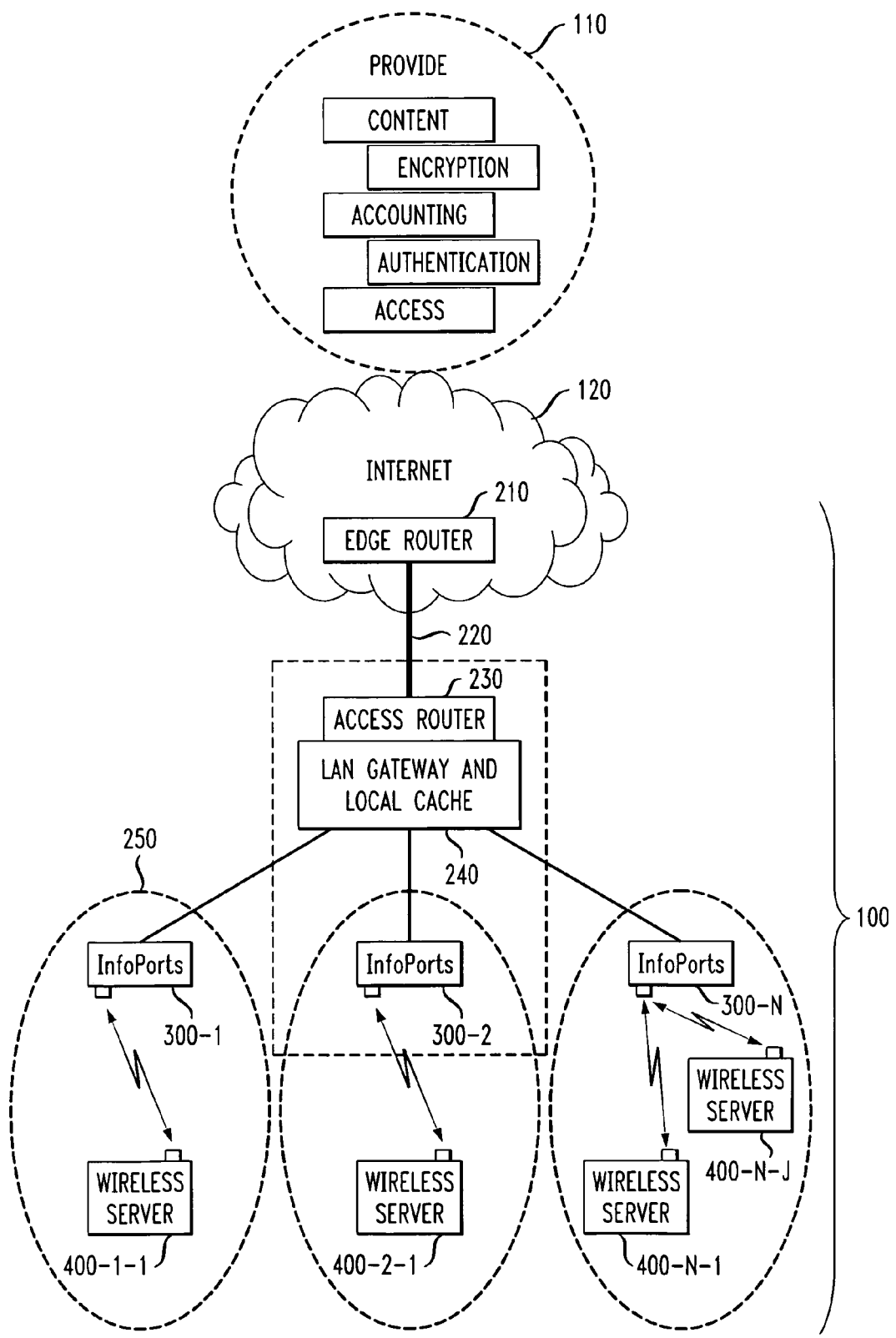
FIG. 2 illustrates the distributed mobile broadband network of FIG. 1 in further detail.

FIG. 2 illustrates the distributed mobile broadband network 100 of the present invention in further detail. The distributed mobile broadband network 100 is envisioned as a highly asymmetric (large down stream, limited upstream) quasi-mobile IP based public network capable of handling a wide range of applications involving high data rate transfers to in-vehicle mobile clients or other users. As shown in FIG. 2, the distributed mobile broadband network 100 consists of one or more distributed wireless servers 300, referred to as information ports or "InfoPorts" for short, that may be positioned, for example, at frequently visited public areas 250. The wireless servers 300 may be connected to the Internet 120, for example, over a wide area network 220 through an edge router 210. In a further variation, an ISP can directly connect the wireless servers 300 to its local point of presence.

A subscriber wireless device 400 can communicate with the distributed mobile broadband network 100 if the subscriber wireless device 400 is within a service coverage area 250 of a wireless server 300. It should be noted that by design, the coverage from this system is limited to the service coverage areas 250 served by the wireless servers 300. Thus, dynamic handoff and continuous connectivity are not required in the exemplary embodiment since the client's data communications needs are handled swiftly while in the coverage area 250 of the serving wireless server 300.

The present invention exploits low mobility of the subscriber wireless devices 400 and short range communications to provide high speed media content to the subscriber wireless devices 400 at a relatively low cost. The simplicity of the wireless servers 300, relative to wireless base stations, and the use of free unlicensed radio frequency bands, such as the ISM band, provides a cheaper information distribution system. Additionally, higher data rates than the upcoming Third Generation (3G) cellular will be possible because distributed mobile broadband network 100 wireless transmission is over a short distance and the intended mobiles are at near stationary velocities at these designated places. Such a high-speed wireless link is practical with reasonable cost to consumer. An example is the IEEE standard 802.11a which specifies data transfer of 54 Mbps.

In an exemplary implementation, the wireless servers 300 employ a high rate WLAN standard, such as IEEE 802.11a, to transfer the requested media to the subscriber wireless devices 400. For example, using the emerging IEEE 802.11a short wireless standard, the distributed mobile broadband network 100 concept can offer a data rate of up to 54 Mbps, which is more than 20 times faster than the maximum data rate planned for 3G cellular systems and over 140 times faster than 3G mobile data rates. In the exemplary IEEE 802.11a embodiment, a media file consisting of 15 Mbytes of data is transferred by a wireless server 300 to a subscriber wireless device 400 in less than 3 seconds, versus more than 5 minutes over the mobile 3G network.

The network 120 may be embodied as any combination of public or private wired or wireless links, including a satellite network, a cable network, the Public Switched Telephone Network (PSTN) or a Virtual Private Network (VPN). Generally, the wireless servers 300 have fixed addresses on the global Internet and act as a bridge between the wireless local area network of its cell and the rest of the network 120.

As previously indicated, the content provider 110 pushes electronic media to one or more wireless servers 300 at the edge of the network 120. As shown in FIG. 2, the content provider 110 optionally provides a number of services, in addition to the provided content. For example, the content provider 110 can employ encryption and user authentication techniques to provide network security and copyright control. The user authentication can be handled through standard practices assign a unique electronic serial number (ESN) to each subscriber wireless device 400 and, optionally, a unique personal identification number (PIN) for each user that has an extendable lifetime equal to the current subscription period. In addition, the media content can be encrypted so that decryption software is required on the client unit to present the content properly. In the exemplary embodiment, the subscriber wireless device 400 and wireless server 300 use the ESN and PIN to authenticate the user on the system, as would be apparent to a person of ordinary skill in the art.

In the exemplary embodiment, the cache server 240 is loaded with two classes of content. The first type of content is not specifically requested by a client but is based on a client's "user profile" which would be initially supplied at registration in response to an explicit query or can be learned over time. The second class of content is material specifically requested by a client in advance, for example, by means of their home PC or over the telephone, as discussed further below.

The first class of content would be updated and refined on a regular basis by the service provider based on either the statistical request patterns associated with the second class of content or new information supplied by the client. This approach for distributing content will allow the most economical backhaul facility in terms of "pipe" capacity. In the above scenarios, the first class of content would be cached at several wireless servers 300 based on the typical routes driven by the client (this information would be supplied by the client at registration or learned over time) and is updated based on the client visits to certain wireless servers 300. The second class of content would be cached similarly or have the option of being cached in a wireless server 300 location specified by the client. As subscriber wireless devices 400 enter the coverage area 250 of a wireless server 300, the content cached in the wireless server 300 is rapidly downloaded through the high-speed wireless link enabled by the wireless server 300 and client modem.

For example, in the case of audio content, several hours of programming can be delivered to the user in a short period of time, such as 3 seconds. This is sufficient for off-line playback over a few days, if not weeks, depending on the listening habits of the user. Also, by placing wireless servers 300 at locations often frequented by users, such as gas stations and grocery store parking lots, the user has adequate and convenient access to the downloaded media content.

FIG. 3 is a schematic block diagram of an exemplary wireless server 300. The wireless server 300 may be embodied as a general purpose computing system, as modified herein to incorporate the features and functions of the present invention. For a general discussion of a conventional server, see, for example, Ed Tittel and David Johnson, A Guide To Networking Essentials, Course Technology ITP, Cambridge, Mass. (1998), incorporated by reference herein.

The wireless server 300 includes a processor and related memory (not shown), such as a data storage device, which may be distributed or local. The processor may be embodied as a single processor, or a number of local or distributed processors operating in parallel. The data storage device and/or a read only memory (ROM) are operable to store one or more instructions, which the processor is operable to retrieve, interpret and execute. In addition, the wireless server 300 includes a wireless modem 350, cache storage 360, local keyboard and display 370, and a network interface 380, as would be apparent to a person of ordinary skill in the art. Generally, the cache storage 360 and wireless modem 350 are used in conjunction with the present invention to store and distribute content to the near stationary subscriber wireless devices 400.

In addition, from the software point of view, the wireless server 300 include a LAN server 310, web services 320, mobile IP management services 330, as well as access and authentication admission protocol processes 340.

FIG. 4 is a schematic block diagram of an exemplary subscriber wireless device 400. The subscriber wireless devices 400 are connected mobile multimedia platforms with access bandwidths comparable to a fixed desktop on a LAN. The exemplary subscriber wireless device 400 may be embodied as an 802.11 wireless modem, as modified herein to incorporate the features and functions of the present invention. For a general discussion of a conventional subscriber wireless device, see, for example, EEE 802.11 Wireless LAN Standard, incorporated by reference herein.

The subscriber wireless device 400 includes a processor and related memory (not shown), such as a data storage device, which may be distributed or local. The processor may be embodied as a single processor, or a number of local or distributed processors operating in parallel. The data storage device and/or a read only memory (ROM) are operable to store one or more instructions, which the processor is operable to retrieve, interpret and execute. In addition, the subscriber wireless device 400 includes a wireless modem 450, cache storage 460, user interface 470, and a global positioning system (GPS) 480, as would be apparent to a person of ordinary skill in the art. Generally, the wireless modem 450 and cache storage 460 are used in conjunction with the present invention to receive and store content at the near stationary subscriber wireless devices 400 and the GPS 480 is used to provide the location of the user. The user interface 470 can include display for presenting image-based content to the user. In addition, from the software point of view, the subscriber wireless device 400 include a WLAN stack 410, cache management process 420, as well as source decoding and decryption services 440.

Operation

It is envisioned that subscriber wireless devices 400 would be positioned within the coverage area 250. For example, a car equipped with a subscriber wireless device 400 could park within the coverage area 250 to download content for subsequent playback. Users would have the option of pre-selecting the content, for example, from the service provider's Web site via their home PC, on-site advertisement, or from a supplied printed content guide (like a TV-Guide) via a telephone. The selected content will be cached from regional servers to a number of wireless servers 300 located along the subscribers preferred driving routes automatically or to one designated by the user, for subsequent delivery to the user when the user is positioned in the coverage area 250 of the designated wireless server 300. This routing information would initially be supplied upon subscription to the service. In addition, using the subscriber content access or the device GPS information, the distributed mobile broadband network 100 could learn which wireless servers 300 a particular subscriber most frequents and cache the selected content at the appropriate locations.

Besides caching subscriber selected multimedia content for later downloading, it is envisioned that a variety of interesting pre-packaged content will be cached at any wireless server 300, based on the demand pattern of subscribers. This would allow subscribers, who may have forgotten or do not wish to select and order content in advance, to visit a wireless server 300 along one of their driving routes and still obtain desired content that matches their interests. The present invention can also present information about a given location, such as a sale at the mall or a show at the local theater, to be distributed on-site to the visitors at the location. The downloaded content may include audio, images or text or any combination of the foregoing.

FIG. 5 is a flow chart describing the operation of a content caching and delivery process 500 incorporating features of the present invention. As shown in FIG. 5, the content caching and delivery process 500 is initiated during step 510 upon receipt of a subscriber request. The subscriber request is processed by the content caching and delivery process 500 during step 520 using the previously provided subscriber preference information 522, if any, and hardware identity information 526 (ESN and PIN, as discussed above), to compile the information and identify an appropriate wireless server 300.

The content is provided to an appropriate wireless server 300 during step 530, and the wireless server 300 performs a test during step 540 when a user (subscriber) enters its coverage area to determine if the subscriber has any deliverable awaiting. If it is determined during step 540 that there is content deliverable to the user, then the content is transferred to the client device (subscriber wireless device 400) during step 545, before proceeding to step 555, discussed below.

If, however, it is determined during step 540 that there is no deliverable content for this user, then a further test is performed during step 550 to determine if there is a new offer for this user. If it is determined during step 550 that there is a new offer, then the content is transferred to the client device (subscriber wireless device 400) during step 545, before proceeding to step 555, discussed below. If, however, it is determined during step 550 that there is not a new offer, then the process proceeds to step 555 to determine if the user has a "local request."

If there is no new request, then a further test is performed during step 560 to determine if the request is a "new request." If it is determined during step 560 that the request is a "new request," then the content is present or should be retrieved and is stored in the local cache 360 of the wireless server 300 during step 570, before proceeding to step 530 discussed above. If, however, it is determined during step 560 that there is no "new request," then program control terminates during step 565.

The present invention may be effectively employed to provide a new range of services for mobile users that otherwise is not feasible with traditional mobile technology and available spectrum. The present invention provides distribution of and access to multimedia information at public places and provides a point-of-sale outlet for on-the-go electronic material (similar to carryout for food). In addition, the present invention can allow business transactions and related applications to be conducted, such as checking on the status of and the moving of money across bank accounts, seeing a retailer's list of items and ordering with a credit card for quick pick up or delivery and even checking messages and communicating with an office while on the go.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, orthogonal frequency division or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure the associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention. For example, while the exemplary embodiment contemplates a subscription-based service, a non-subscription-based service would be within the scope of the present invention, as would be apparent to a person of ordinary skill in the art.

We claim:

1. A method for providing information to a user, comprising the steps of:
    selecting content for storage based on one or more user preferences;
    storing said content in at least one selected wireless server connected to a network, wherein said selected wireless server is selected based on a prediction that said user will be located in a coverage region of said selected wireless server after said storage step is performed and wherein said user is located outside said coverage region when said wireless server selection is performed; and
    directly transferring said information from said at least one wireless server to said user using a short range wireless access technique.

2. The method according to claim 1, wherein said user employs a near stationary wireless device.

3. The method according to claim 2, wherein said near stationary wireless device is positioned at a designated location to access said information.

4. The method according to claim 1, wherein said short-range wireless access technique conforms to the IEEE standard 802.11a.

5. The method according to claim 1, wherein said one or more user preferences are based on precious user selections.

6. The method according to claim 1, wherein said one or more user preferences are based on previous user preferences.

7. The method according to claim 1, further comprising the step of receiving a user selection of said information.

8. The method according to claim 1, further comprising the step of receiving said one or more user preferences for receiving said information.

9. The method according to claim 1, further comprising the step of authenticating said user.

10. The method according to claim 1, wherein said information is non-real-time content.

11. The method according to claim 1, wherein said user is a mobile user.

12. The method according to claim 1, wherein said information is transferred in a short interval.

13. The method according to claim 1, wherein said wireless access technique provides a common backhaul and a short range high speed transfer of said information.

14. A distributed mobile broadband network for distributing information to one or more users, comprising:
    a central server for storing said information; and
    a plurality of wireless servers connected to said central server by a network, wherein said wireless servers directly provide said information to said one or more users using a short range wireless access technique, and wherein said information is selected for storage at one or more of said plurality of wireless servers based on one or more user preferences, wherein said one or more wireless servers are selected based on a prediction that said user will be located in a coverage region of said one or more wireless servers after said storage step is performed and wherein said user is located outside said coverage region when said wireless server selection is performed.

15. The distributed mobile broadband network of claim 14, wherein said central server processes requests for said information.

16. The distributed mobile broadband network of claim 14, wherein said plurality of wireless servers are distributed.

17. The distributed mobile broadband network of claim 14, wherein said users employ a near stationary wireless device that is positioned at a designated location.

18. The distributed mobile broadband network of claim 14, wherein said short-range wireless access technique conforms to the IEEE standard 802.11a.

19. The distributed mobile broadband network of claim 14, wherein said information is non-real-time content.

20. A wireless server for distributing information to one or more users, comprising:
    a network connection to a central server that stores said information; and
    a wireless modem for directly providing said information to said one or more users using a short range wireless access technique, wherein said central server provides said information when said central server senses said user presence in a coverage area and determines that there is an outstanding deliverable to said user, wherein said coverage area is selected based on a prediction that said user will be located in said coverage area after said selection is performed and wherein said user is located outside said coverage area when said coverage selection is performed.

21. The wireless server of claim 20, wherein said central server stores said information when said central server senses that said user accepts an on-site offer.

22. The wireless server of claim 20, wherein said users employ a near stationary wireless device that are positioned at a designated location to access said information.

23. The wireless server of claim 20, wherein said short-range wireless access technique conforms to the IEEE standard 802.11a.

24. The wireless server of claim 20, wherein said information is non-real-time content.

25. A user device for accessing information from a distributed mobile broadband network, comprising:
    a short range wireless modem for directly receiving said information from a selected wireless server on said distributed mobile broadband network, wherein said information is selected for storage at said wireless server based on one or more user preferences, wherein said wireless server is selected based on a prediction that said user will be located in a coverage region of said selected wireless server after said storage is performed and wherein said user is located outside said coverage region when said wireless server selection is performed; and a processor for processing said information.

26. The user device of claim 25, further comprising a memory device for storing said information.

27. The user device of claim 25, further comprising a decoder for de-encrypting said information.

28. The user device of claim 25, further comprising a media handler for playback of said information.

29. The user device of claim 25, wherein said user device is in a vehicle.

* * * * *

UNITED STATES PATENT AND TRADEMARK OFFICE
CERTIFICATE OF CORRECTION

PATENT NO. : 7,639,654 B2
APPLICATION NO. : 10/231218
DATED : December 29, 2009
INVENTOR(S) : Riazi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2174 days.

Signed and Sealed this

Twenty-first Day of December, 2010

David J. Kappos
*Director of the United States Patent and Trademark Office*